Dec. 5, 1961   H. MENCHE   3,011,188
APPLIANCE FOR CLEANING FLOORS AND COVERINGS THEREOF
Filed May 31, 1960
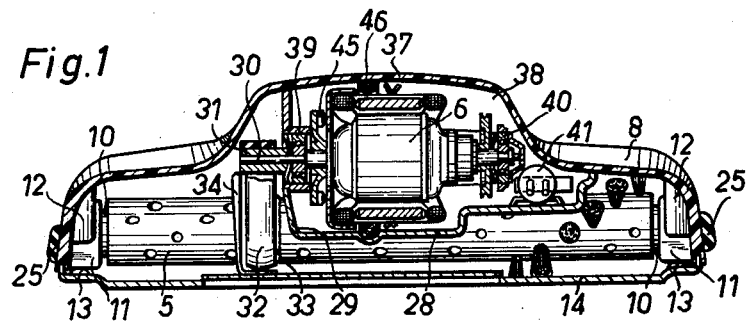
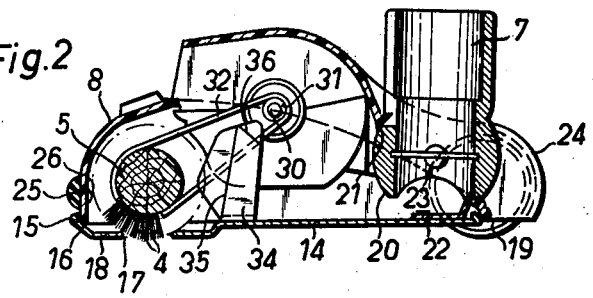
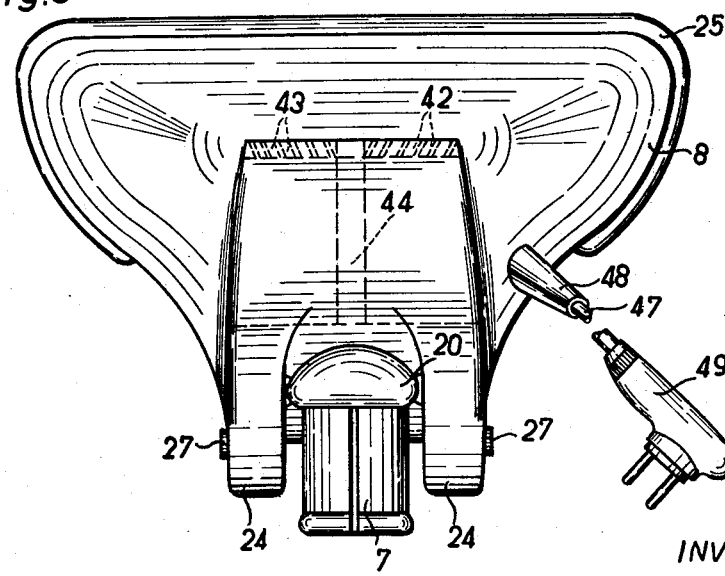
INVENTOR
Heinrich Menche
By Michael S. Striker
Attorney

United States Patent Office 3,011,188
Patented Dec. 5, 1961

3,011,188
APPLIANCE FOR CLEANING FLOORS
AND COVERINGS THEREOF
Heinrich Menche, Remscheid-Lennep, Germany, assignor to Vorwerk & Co., Wuppertal-Barmen, Germany, a firm
Filed May 31, 1960, Ser. No. 32,920
Claims priority, application Germany Dec. 8, 1959
12 Claims. (Cl. 15—49)

This invention relates to appliances for cleaning floors and floor coverings, such as carpets and the like, particularly for use in conjunction with domestic vacuum cleaners, which comprise a casing, an electric motor with a shaft in said casing for driving a rotary beater and/or sweeper barrel, particularly a sweeper brush, and a belt in the form of a flat rubber belt for connecting the motor with the barrel.

It is the object of the invention to improve such appliances in several respects, and more especially to prevent their metallic bottom plates from the accumulating an electrostatic charge.

Substantially, the invention achieves the contemplated object by providing a belt having an electrical resistance which, measured between the driving shaft of the motor and the driven barrel, does not exceed about 100 megohms but lies above 2 megohms which represent the prescribed lower limit for safe insulation. This allows to prevent the accumulation of an electrostatic charge in the metallic bottom plate which may otherwise occur if a conventional belt having an electrical resistance exceeding 10,000 megohms is used, and therefor, the user can touch the appliance, and especially the bottom plate thereof, without running the risk of receiving a shock due to the presence of such an electrostatic charge. Conveniently, the belt is composed of materials of different electrical resistivities. By the suitable choice of component materials a belt having the specified electrical resistance can be easily produced at low cost.

According to another feature of the invention, the thickness of the belt is less than 1.8 mm. for cooperation with a motor pulley of a diameter of about 8 to 13 mm. This thickness of the belt has been found especially appropriate for achieving optimum life at the required high speed of travel of the belt because, despite the high tensile stress to which the driving strand of the belt is subjected, it reduces to moderate proportions the energy losses which rise approximately in ratio with the third power of the gauge of the belt, and which are due to the deflection of the belt especially on the motor pulley which has a diameter of between 8 and 13 mm. so that the effort expended in straining the outer layer of fibres in the deflected zone is considerable.

According to a further feature of the invention there is associated with the belt a metallic belt guide which is secured to the metallic bottom plate of the casing of the appliance. The object of this arrangement is to conduct to the bottom plate the heat which is generated by the friction between the belt guide and the belt when it travels at a considerable speed. Accumulations of heat in the belt guide and the belt, which contribute towards increasing the wear of the belt, can thus be effectively avoided.

Conveniently, the upright portion of the belt guide is slightly angularly offset about a more or less vertical line. This prevents the edges of the belt guide from rubbing along the belt and thus likewise contributing to premature wear.

Furthermore, the invention proposes to make the running face of the motor pulley wider than the belt so as to project outwardly beyond the belt guide. This arrangement prevents the belt from running off the pulley and thereby improves the operational reliability of the appliance.

According to yet another feature of the invention, the barrel which is driven by the belt may have a bristle clothing consisting of a mixture of natural and synthetic bristles. Natural bristles which have an excellent sweeping effect because under normal conditions short lengths break away from their ends and thus keep them pointed and sharp, have a longer life when supported by the presence of synthetic bristles which are more resistant to fracture but less effective for sweeping because their points become rounded in use. In other words, it is the principal purpose of the synthetic bristles to support the natural bristles and hence to protect them from excessive wear, whereas the sweeping effect of the brush will be substantially determined by the effect of the natural bristles.

The invention proposes to provide a mixed bristle clothing consisting preferably of between 30 and 50% natural bristles and of 70 to 50% synthetic bristles. A mixed bristle clothing of this composition approaches the life of synthetic bristles though approximately exhibiting the sweeping effect of natural bristles.

Conveniently, the life and sweeping efficiency of a bristle clothing according to the invention on a rapidly revolving sweeper barrel may be further improved by carefully balancing the barrel by means of weights. This will ensure smooth running of the barrel besides subjecting the bristle clothing of the barrel to uniform wear. At the same time noise in operation is very much less.

A preferred embodiment of the invention will now be described by way of example and with reference to the accompanying drawing, in which:

FIG. 1 is a vertical longitudinal section through a cleaning appliance according to the invention;

FIG. 2 is a vertical transverse section through the cleaning appliance, and

FIG. 3 is a top plan view thereof.

As shown in the FIGS. 1 and 2, the cleaning appliance substantially comprises a rotary sweeper brush including a barrel 5 clothed with bristles 4 affixed to the barrel in a helix, an electric driving motor 6 for the sweeper brush, a connecting branch 7 for connecting the cleaning appliance with the suction branch of a vacuum cleaner, and a casing 8 substantially in the form of a cap which encloses the entire assembly. The casing 8 consists of an insulating material, preferably an impact and shock-resistant plastic, such as a polyamide. As can be seen from FIG. 3, the casing 8 has the approximate shape of a trapezium the parallel sides of which form the front and the rear of the cleaning appliance. Mounted adjacent the wider forward edge under the casing 8 is the barrel 5 of the sweeper brush which consists of a non-metallic material. The barrel 5 is mounted on a shaft extending through a hole drilled centrally through the barrel. The ends of the shaft which project from the ends of the barrel are arranged to run in bearing bushes consisting preferably of a sintered metal. Each bearing bush is housed in a bearing box 10 the wall of which facing the barrels is extended so far as to engage a circular groove formed in the end face of the barrel, thereby creating a kind of labyrinth seal enclosing the shaft. The bearing boxes 10 rest with a tight fit in bearing blocks 11 of substantially rectangular shape and adapted to be adjusted in height in guideways 12 formed on the inside of the casing 8. The bearing blocks 11 which preferably consist of a soft elastic insulating material rest with their bottom surface on projections 13 of a metallic bottom plate 14 forming the underside of the casing 8.

The bottom plate 14 fits tightly onto the lower edge of the casing 8 and has at its front edge a hook-shaped, obliquely upwarding extending flange 15 adapted to engage behind an outer projection 16 on the casing 8, whereas in its rear region it is affixed to the casing 8 by a screw (not shown). The bottom plate 14 which closes the open underside of the substantially cap-like casing 8 has a transverse aperture 17 in the region of the sweeper brush through which the bristles 4 of the brush can project. The edges of the transverse aperture 17 have a short inward radius and the aperture itself is traversed at intervals by narrow reinforcing cross members. The marginal portions of the bottom plate 14 surrounding the aperture 17 are offset in the downward direction to form a sliding face 18. The rear end of the cleaning appliance is supported on rollers 19 located on either side of the tubular connecting branch 7. The tubular connecting branch 7 is of rigid construction and tiltably held in a fork-shaped extension of the casing 8 at the rear end of the appliance. It has a spherical bearing surface 20 which movably fits into a correspondingly curved spherical socket 21 in the casing 8. The tubular connecting branch 7 can be deflected between two limits. In one position it is substantially vertical, whereas in the other it is substantially horizontal. In FIG. 2 the tubular connecting branch 7 is shown in its vertical position in which it is arrestable by a spring 22 affixed to the bottom plate 14. In the illustrated embodiment the tubular connecting branch 7 is suspended on pivots 23 which engage corresponding slots in arms 24 of the fork-shaped extension at the rear of the appliance.

The side walls of the casing 8 are provided with a bumper bead 25 which consists of a soft elastic material, such as rubber or a thermoplastic, and which embraces the front as well as substantially the sides of the appliance, protecting the same from bumps and the furniture and walls of the room in which the appliance is used from damage. The bumper bead 25 is fastened to the appliance by rivet head-like projections 26 on the inside face of the bumper bead which extend through holes in the casing 8.

The arms 24 of the forked extension at the rear of the appliance also carry the rollers 19. The axles of the rollers 19 pass through the side walls of the two arms 24 and in the illustrated embodiment they are formed with a head 27 which is secured against extraction by a pin-shaped key pushed into the headless end of the axle on the opposite side of the arms. The rollers 19 are vastly covered at their outside by the cowl-like construction of the arms. The electric driving motor 6 of the appliance is separated from a chamber housing the sweeper brush, and a connecting channel leading from this chamber to the vacuum cleaner by a partition 28 comprising a lower dished portion and a side portion 29. In the region of the joint between the side portion 29 and another rib-shaped partition formed on the casing 8, the motor shaft 30 which carries a pulley 31 projects into the sweeper brush chamber. A belt 32 connects the pulley 31 on the motor shaft 30 with a cambered section 33 formed on the peripheral surface of the barrel 5 of the brush. The cambered section 33 acting as a pulley may be formed on the barrel 5 when this is being made, for instance on a lathe.

30 to 50% of the bunches of bristles 4 of the sweeper brush consist of natural bristles, preferably Mexico fibre, whereas the remaining 70–50% are synthetic bristles, particularly nylon or some other polyamide. This mixture ensures a long life as well as satisfactory brushing efficiency of the sweeper brush, because in course of use the ends of the natural bristles tend to break off in short lengths and thus automatically renew their sharp pointed ends, whereas the more durable synthetic bristles support the adjacent natural bristles and protect them, thereby imparting to the bundles of mixed bristles 4 approximately the same length of life as that of pure bristles of polyamide without substantially reducing the good brushing effect of Mexico fibre bristles. The durability of this composition of the bunches of bristles 4 is further assisted by a careful balancing of the barrel 5 of the sweeper brush. This is conveniently done by the insertion of small pieces of lead (not shown). The sweeper brush will then run smoothly and quietly, submitting the bristles to uniform wear with less noise in operation.

As can be seen particularly from FIGS. 1 and 2, a belt guide 34 is provided for guiding the belt 32. The belt guide 34 preferably consists of metal and is affixed to the bottom plate 14. The belt guide conducts the frictional heat to the metallic bottom plate 14 to avoid an accumulation of heat in the belt guide. As can be seen particularly from FIG. 1, the belt guide 34 consists of an angled piece of sheet metal the upright portion of which affords to guide one edge of the driving strand of the belt 32. On the opposite edge the belt 32 is prevented from migrating by the lateral portion 29 of the partition 28. In order to prevent the edges of the belt guide 34 from rubbing against the belt 32, the belt guide 34 is slightly angularly offset about a substantially vertical line 35 in such a way that only its central projecting region can actually make contact with the belt. For the same reason the upper corner of the belt guide 34 facing the pulley 31 is slightly bent in the outward direction along a line 36, that is to say away from the belt. The width of the motor pulley 31 is such that the whole width of the belt 32 will still run on the pulley when the edge of the belt is in contact with the belt guide 34. The belt is therefore effectively prevented from running off the pulley. The belt 32 consists of an elastic material such as rubber and it is flat. Its thickness does not exceed 1.8 mm. In view of the usual high speed of travel of the belt in such a cleaning appliance and the relatively small diameter of the pulleys, the above specified thickness of the belt has proved to be the most satisfactory one because the power loss which is approximately proportional to the third power of the belt thickness and which arises when the belt is deflected, particularly on the motor pulley which has a diameter of about 8 to 13 mm., owing to the effort of straining the outer fibers, will remain within tolerable limits, thus ensuring that the belt 32 will last for a considerable time despite the high tensile stress to which the driving strand of the belt is subjected.

The belt 32 is contrived to have an electrical resistance of about 100 megohms or less, its minimum resistance being governed by the regulations relating to the safety of this electrical appliance and being at least 2 megohms to be measured between the driving shaft and the driven shaft. When the belt has an electrical resistance not exceeding 100 megohms, the possibility of the bottom plate 14 accumulating an electrostatic charge is eliminated, so that the user of the appliance can touch the bottom plate without running the risk of receiving a shock due to the presence of such a charge. The required electrical resistance of the belt can be easily provided by the suitable combination of the materials of which it is made. It may be a special rubber mixture with a proportion of carbon to give the desired resistance. An alternative would consist in applying to the surface of the belt a special layer, such as an electrically conducting film of varnish, which in conjunction with the base material of the belt establishes the desired electrical resistance. Conveniently, only the outer surface of the belt 32 need be provided with such a film, since on the inside surface it would be exposed to considerable abrasion as the belt travels over the pulleys.

The partition 28 together with a domed portion 37 of the casing 8 forms a chamber 38 for the electric driving motor 6 having bearings 39 and 40, and an interference suppressor 41. Through an opening 42 protected by a grill the chamber 38 communicates with the outer atmosphere. The bars of this grill are embodied in upright blades 43 disposed on either side of a central partition 44 with opposite angles of incidence, as shown in FIG. 3, with respect to a fan 45 mounted on the shaft of the driving motor 6 for the generation of a current of cooling air. The partition is formed by a soft elastic ring 46 embracing the outside of the driving motor 6 and bearing against the inside of the wall of the chamber 38, so that the cooling air is forced to pass through the chamber 38 without meeting obstructions.

For the introduction of a current-supply cable 47 the chamber 38 has an opening lined by a shoft elastic sleeve 48 which closely embraces the cable 47 and supports the same to prevent fracture. The free end of the cable 47 is fitted with a flat pin-type plug 49 insertable into a cooperating socket in the vacuum cleaner.

The above described embodiment is merely illustrative of the invention and is not intended to limit its scope. The invention can be modified in various ways and adapted to different purposes and applications. For instance, the natural bristles might be piassava, hog bristles, horsehairs, and so forth.

What I claim is:

1. A device for treating floors or floor coverings, comprising, in combination, a casing including a metal bottom plate having an opening; an operating member rotatably mounted in said casing and having a pulley and a portion located in said opening for treating a surface on which said bottom plate is located so that during treatment of said surface an electrostatic charge accumulates in said bottom plate; a motor supported in said casing and having a motor pulley; and a belt connecting said pulleys and having between said pulleys an electric resistance between two megohms and one hundred megohms whereby an electrostatic charge accumulating in said bottom plate is dissipated through said belt.

2. A device as set forth in claim 1 wherein said belt is composed of a plurality of materials having different electric resistances.

3. A device as set forth in claim 2 wherein said materials are uniformly distributed through the thickness of said belt.

4. A device as set forth in claim 2 wherein said materials are disposed in layers superimposed through the thickness of said belt.

5. A device as set forth in claim 4 wherein the outermost layer located on the outside of said belt has a low electric resistance.

6. A device as set forth in claim 5 wherein said outermost layer is a coat of electrically conductive varnish.

7. A device as set forth in claim 2 wherein said motor pulley has a diameter between 8 mm. and 13 mm.; and wherein said belt has a thickness less than 1.8 mm.

8. A device as set forth in claim 2 and including a metallic belt contacting member secured to said metal bottom plate in thermo-conductive relation and slidably engaging said belt for conducting heat from the same to said bottom plate where the heat is dissipated.

9. A device as set forth in claim 8 wherein said belt contacting member has edge portions curving away from said belt and from said motor pulley so that the edges of said belt contacting member are spaced from said belt.

10. A device as set forth in claim 2 wherein said operating member is a rotary brush having tufts along the length thereof, said tufts being formed of a mixture of natural and synthetic bristles so that said natural bristles are protected by said synthetic bristles and are worn off at substantially the same rate as said synthetic bristles.

11. A device as set forth in claim 10 wherein each of said tufts contains 30% to 50% natural bristles and 70% to 50% synthetic bristles so as to be uniformly worn off.

12. A device as set forth in claim 11 wherein said natural bristles consist of Mexico fiber and said synthetic bristles consist of a polyamide.

References Cited in the file of this patent

UNITED STATES PATENTS

| | | |
|---|---|---|
| 815,814 | Green | Mar. 20, 1906 |
| 1,372,622 | Hoover | Mar. 22, 1921 |
| 2,102,221 | Riebel et al. | Dec. 14, 1937 |
| 2,300,267 | Smellie | Oct. 27, 1942 |
| 2,459,007 | Taylor | Jan. 11, 1949 |
| 2,475,808 | Storm | July 12, 1949 |
| 2,845,962 | Bulgin | Aug. 5, 1958 |

FOREIGN PATENTS

| | | |
|---|---|---|
| 584,478 | Great Britain | Jan. 15, 1947 |